(No Model.) 2 Sheets—Sheet 2.
R. EICKEMEYER.
TELEPHONE.
No. 351,905. Patented Nov. 2, 1886.
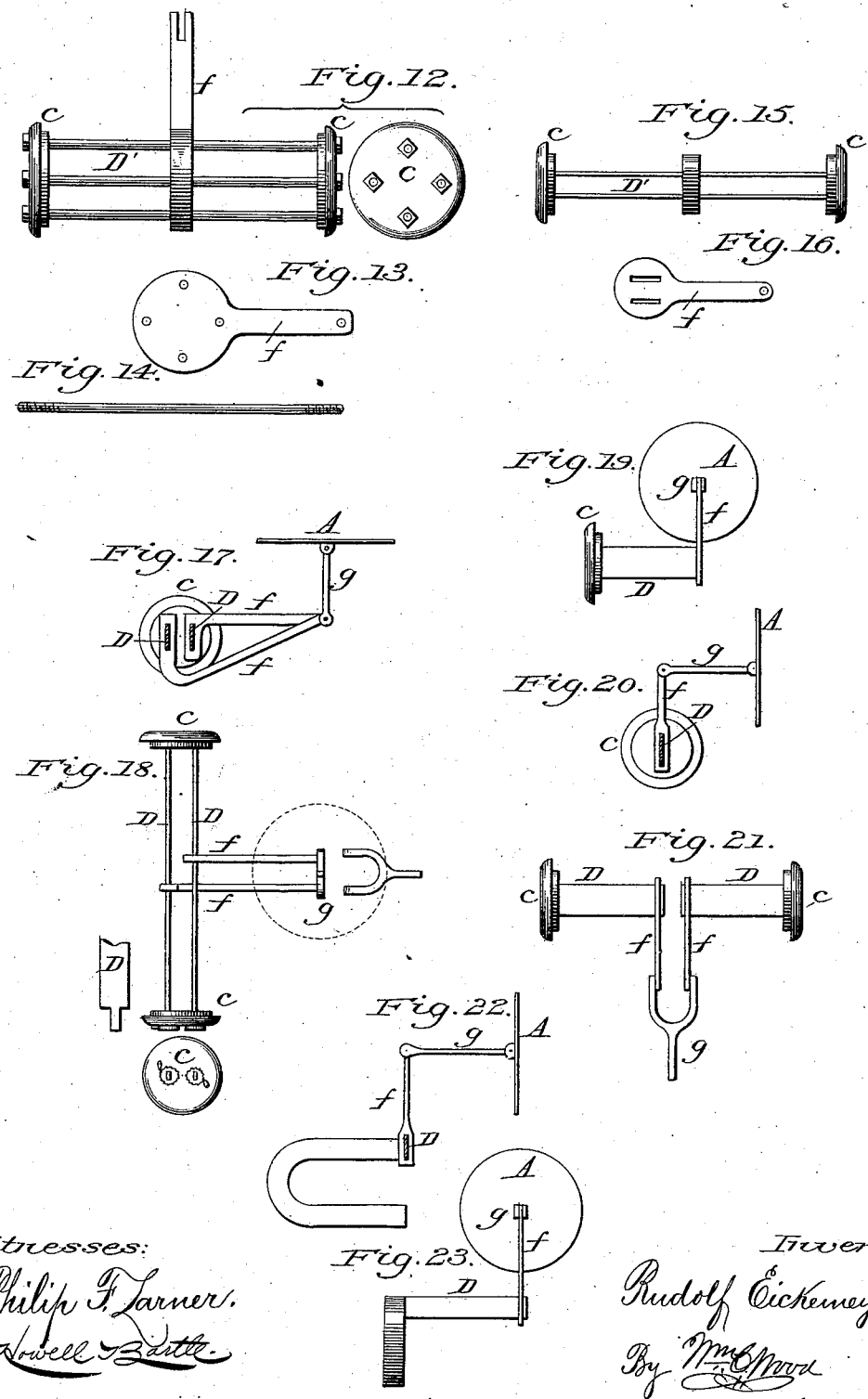
Witnesses:
Philip F. Larner.
Howell Battle.
Inventor
Rudolf Eickemeyer.
By [signature]
Attorney.

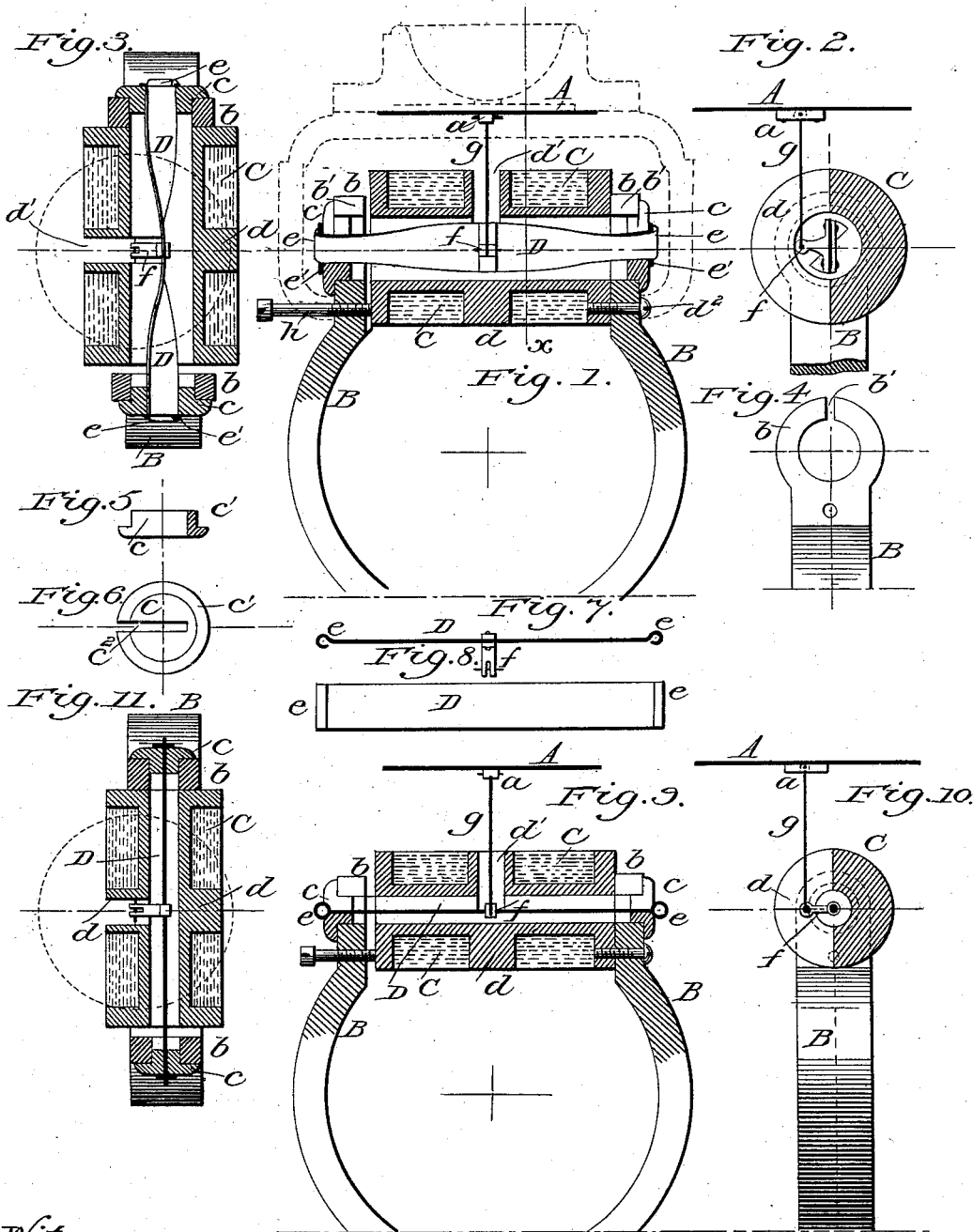

UNITED STATES PATENT OFFICE.

RUDOLF EICKEMEYER, OF YONKERS, NEW YORK.

TELEPHONE.

SPECIFICATION forming part of Letters Patent No. 351,905, dated November 2, 1886.

Application filed June 23, 1885. Serial No. 169,588. (No model.)

*To all whom it may concern:*

Be it known that I, RUDOLF EICKEMEYER, of Yonkers, in the county of Westchester and State of New York, have invented a certain new and useful Telephone; and I do hereby declare that the following specification, taken in connection with the drawings furnished and forming a part thereof, is a clear, true, and complete description of my invention.

My said invention involves a novel application of the well-known principle which is illustrated by the fact that the electro-magnetization of a flexible bar twisted and maintained under torsional tension results more or less in the untwisting of said bar, and that a succeeding partial or complete demagnetization of said bar permits it to resume its normal condition. So far as my knowledge extends I am the first to employ this principle for telephonic purposes, and I avail myself thereof by so connecting a sounding-diaphragm with a bar (or bars) under torsional tension and within a helix that when said helix is exposed to and relieved from electric currents said bar or bars, by an untwisting and twisting action, cause the diaphragm to vibrate, and as a result afford audible sounds when the electric currents thus applied to the helix are properly controlled—as, for instance, by any suitable telephonic transmitter. This vibration of the diaphragm, as described, by torsional force, variably controlled by magnetism resulting from variable electric currents, I deem to be a novel method of operating telephonic diaphragms, or such an equivalent thereof as will afford the requisite sound-waves.

After a full description of my novel telephones, the separate features of my invention will be specified in the several claims hereunto annexed.

Referring to the drawings, Figure 1 is a longitudinal vertical section of so much of one of my novel telephones as is deemed necessary for illustration. Fig. 2 is a lateral vertical section of the same on line $x$, Fig. 1. Fig. 3 is a longitudinal horizontal section of the same. Fig. 4 is a detached end view of one of the poles of a permanent magnet as employed by me. Figs. 5 and 6 are respectively a diametrical section and a side view of one of two end supports for certain forms of torsional bar. Figs. 7 and 8 are respectively an edge and a side view of one form of torsional bar as employed by me. Figs. 9, 10, and 11 are views of a similar telephone modified as to the form of the torsional bar. Figs. 12 to 23, inclusive, Sheet 2, illustrate various modifications in telephones embodying certain features of my invention, and to which special reference will hereinafter be made.

In Fig. 1 I have indicated in dotted lines a suitable form of casing and mouth-piece, which may be composed of wood, hard rubber, papier-maché, or other material suitable for that purpose. Said casing is also provided with the usual posts for connecting the helix with the usual flexible conducting-cords.

The diaphragm A is secured, as usual, in the casing, and is capable of such vibrations as will result in audible sounds, as in any telephone; but it need not be composed of iron, because it is never in itself magnetically influenced. At the rear or inner side of the diaphragm it is provided at its center with a pin-joint, $a$.

A permanent magnet, B, as here shown, is substantially U-shaped, and its poles $b$ are annular in form, as seen in Fig. 4, and have a slit at the top of each, as at $b'$, also shown in Fig. 1. At each pole of the magnet there is an end support or head, $c$, (shown detached in Figs. 5 and 6,) which snugly occupies the annular opening in said pole, and it is flanged, as at $c'$, for affording a good seat against the coincident surface of the magnet. These end supports or heads are each provided with a radial slot, $c^2$. These heads $c$ are preferably composed of non-magnetic metal; but they may be composed of material other than metal, if desired.

Between the poles of the permanent magnet there is mounted a helix, C, composed of two correspondingly-wound coils upon a double spool, $d$, and the ends of the helix-wire are connected with the usual posts in the casing. The spool $d$ is centrally slotted radially, as at $d'$. The helix is secured in place by one or more screws, $d^2$.

The torsional bar D, as shown in Figs. 1 to 3, inclusive, is a thin piece of flexible soft iron, wider in the center than at either end, and at each end it is provided with an eye, $e$, for the reception of a straining-pin, $e'$. In Figs. 7 and 8 this torsional bar is shown of uniform width, and in Figs. 9 to 11, inclusive, it is shown to be a round wire.

The torsional bar, instead of being composed of a single piece of flat or round iron, may embody several pieces of metal without departure from my invention—as, for instance, in order to provide for a high degree of sensitiveness, so that the action of the bar will be in harmony with even the slightest graduations or variations in the helix-currents, said bar should be composed of a series of round (and sometimes flat) wires, as shown in Figs. 12 to 14, which may be varied as to size or bulk, circularly arranged, and secured individually at each of its ends to the heads $c$, forming a complex bar, D′, and in such case each of said wires is preferably provided with a thread and nut, whereby it may be separately adjusted as to tension, although, as a whole, all of said wires may be tensionally adjusted, as hereinafter described.

Instead of the single bar of sheet metal, two round or flat parallel rods or wires can be used, as will be hereinafter further described. However the form of the torsional bar may be varied, it is provided centrally with an arm, $f$, projecting from one side thereof, having a pin-eye at its outer end for connecting the bar with the diaphragm A by means of the light rod or link $g$. With the wide flat bar the arm $f$ rigidly projects from a plate secured to one side of said bar. When the round wire or a narrow flat one is employed, the arm $f$ is provided with a single eye, through which the bar passes, the bar and arm being firmly united, as by solder, or by swaging the arm upon the bar. When more than one flat or round wire is employed, as shown in Figs. 15 and 16, as well as in Figs. 12 to 14, the arm $f$ projects from a plate having an eye for each wire, it being understood in this case that said wires are not separately twisted, but that they, as a whole, make up a bar which is capable of being twisted as if but one rod or wire was used.

I do not, however, limit myself to the employment of a single torsional bar within the helix, whether said bar be simple or complex in its construction, because I am well aware that more than one bar may be used with good results, and that each may be separately twisted and maintained under a tensional strain peculiar to itself, and that each may be connected separately with the link $g$, in order that each bar may operate to some extent independently of the other, although at times they would co-operate after the manner of a single bar, as illustrated in Figs. 17 and 18. In all cases the torsional bar is mounted between suitable end supports or heads. For the bars, as shown, I have devised the heads $c$. The slots $b'$ and $c^2$ enable a single flat or round bar to be readily placed in position, and the eyes $e$ on the ends of such a bar, being larger than the width of said slots, have a good bearing on the outer sides thereof, supplemented by the straining-pins $e'$, which partially overlap said heads. When thus mounted, the bar is twisted at each end to produce the torsional effect, and this is accomplished by partially rotating the two heads $c$ in the same direction, the arm $f$, link $g$, and the diaphragm A meantime maintaining the central portion of the bar in substantially its normal position. The torsional bar is also under tension longitudinally, partially as an obvious result of the twisting of the bar; but as it is desirable that said tension be adjustable, I have the shank of the permanent magnet of such bulk and form as will enable its poles to be sprung outwardly, and employ therewith an adjusting-screw, $h$, which occupies a tapped hole in the magnet and bears with its inner end against the coincident end of the spool of the helix, thus by springing the poles apart enabling a varied adjustment of the tension of said bar. The frictional contact of the heads $c$ with their seats will ordinarily prevent them from being rotated by the twisted bar.

With either form of torsional bar described, it will be seen that when properly twisted and under proper tension said bar will be partially untwisted when magnetized by the helix-currents, and be practically demagnetized when the electric current is cut from or terminated in the helix, and therefore said bar will be permitted to resume its normal twisted condition and exercise its full torsional force. It will also be seen that the torsional action of said bar will vibrate the arm projecting therefrom, and correspondingly vibrate the diaphragm. When mounted upon a permanent magnet, as shown, the torsional bar is of course at all times more or less magnetized or polarized by induction from the permanent magnet; but the permanent magnet may have substituted therefor an electro-magnet with an independent helix, and if direct instead of induction currents be employed with the helix C, no magnet need be used for supporting and co-operating with the helix and bar.

Although I have stated that the torsional bars shown are composed of thin soft iron, I do not preclude myself from the use of such as may be permanently magnetized, because it is obvious that so long as they are capable of being untwisted more or less by the currents in the helix, and of resuming their normal condition when said currents are terminated, these would involve no substantial departure from the main feature of my invention.

Although I have only shown bars which are twisted from a point midway thereof, I do not preclude myself from the use of a twisted bar which is connected at one end by an arm and a link to the diaphragm, as illustrated in Figs. 19 and 20, for I am well aware that such are capable of producing good results, as is also the case with a bar composed of two separate pieces jointed in the middle by being separately connected to the arm, so that each piece will have a capacity for the untwisting and twisting action independently of the other, and each being independently connected to the link will then have an independent capacity to vibrate the diaphragm, as illustrated in Fig. 21. Good results have also been obtained by me with a torsional bar secured at one end by a link to the diaphragm and permanently clamped at the opposite end to any firm abutment or post, and especially when said opposite end is clamped to the pole of a permanent magnet, as shown in Figs. 22 and 23. In all these cases, however, the bars are twisted, and in each case located within a helix, so that when currents pass through said helix the bar is more or less relieved from its "twist," and when the currents cease said bar resumes its normal twisted condition, and by its movements vibrates the diaphragm to which it is connected.

It is sometimes advisable to employ above the diaphragm a light spring, so bearing thereon as to relieve the diaphragm in a measure from the thrusting force of the link $g$ when the bar is under heavy torsion; but such a spring need only to be used when the diaphragm is composed of material comparatively deficient in resilient capacity.

However the torsional bars may be constructed and connected with a diaphragm, my novel method of vibrating the diaphragm will be involved, provided always that said diaphragm be vibrated by torsional force variably controlled by magnetism resulting from variable electric currents.

In the operation of the torsional bar I have found that if its tensional strain and torsional force or capacity be properly adjusted the tendency of the bar to untwist is in direct proportion to the variations in the current passing through the helix, and therefore when the helix-current is varied by the action of sound-waves operating through the diaphragm of a connected transmitter the untwisting and twisting action of said bar will cause the diaphragm which is coupled thereto to vibrate in harmony with the transmitting diaphragm and afford corresponding sound-waves with desirably audible results.

Having thus described my invention, I claim as new and desire to secure by Letters Patent—

1. In a telephone, the combination, substantially as hereinbefore described, of a diaphragm, a helix, and bars under torsional tension within said helix and connected with said diaphragm, whereby the torsional force of said bars is reduced and resumed as a result of the magnetizing and demagnetizing effect upon said bars of electric currents applied to and cut from said helix, and the diaphragm thereby caused to vibrate, as set forth.

2. In a telephone, the combination, substantially as hereinbefore described, of a diaphragm, a helix, and a bar under torsional tension within said helix and connected with said diaphragm, whereby the torsional force of said bar is reduced and resumed as a result of the magnetizing and demagnetizing effect upon said bar of electric currents applied to and cut from said helix, and the vibration of the diaphragm thereby caused, as set forth.

3. In a telephone, the combination, substantially as hereinbefore described, of a permanent magnet, a bar torsionally strained between the poles of said magnet, a helix surrounding the bar, and a diaphragm connected to and vibrated by said bar through its untwisting and twisting action.

4. The combination of the diaphragm, the flexible bar connected therewith, and end supports for said bar, which are adjustable with reference to each other, substantially as described, for varying the longitudinal strain upon said bar, as set forth.

5. The combination of the diaphragm, the flexible bar connected therewith, and end supports for the bar, which are rotatively adjustable, substantially as described, for varying the torsion of said bar, as set forth.

6. The combination of a diaphragm, permanent magnet, helix, and bar within said helix, connected to the diaphragm, and means for twisting said bar, substantially as described.

RUDOLF EICKEMEYER.

Witnesses:
PHILIP F. LARNER,
HOWELL BARTLE.